United States Patent [19]
Seltzer

[11] 3,748,539
[45] July 24, 1973

[54] REMOTE SELF-CONTAINED PORTABLE READOUT DEVICE

[75] Inventor: Daniel A. Seltzer, Cincinnati, Ohio

[73] Assignee: Gamon-Calmet Industries, Inc., Florence, Ky.

[22] Filed: Sept. 24, 1971

[21] Appl. No.: 183,475

[52] U.S. Cl............ 317/120, 317/101 R, 339/45 R, 340/366 R
[51] Int. Cl........................... G08b 5/00, H02b 1/08
[58] Field of Search..................... 340/366 R, 366 E, 340/310, 334; 317/99, 101 R, 118, 126; 339/45 R, 45 M

[56] References Cited
UNITED STATES PATENTS

| 3,599,046 | 8/1971 | Spreitzer | 317/101 R |
| 3,335,386 | 8/1967 | Upton | 339/45 M |
| 3,529,276 | 9/1970 | Hennessey | 339/45 R |
| 3,305,779 | 2/1967 | Errichiello | 317/101 R |
| 3,146,435 | 8/1964 | Kelly | 340/366 R |

Primary Examiner—Robert K. Schaefer
Assistant Examiner—Gerald P. Tolin
Attorney—Lerner, David & Littenberg

[57] ABSTRACT

A self-contained portable device for displaying a reading of information available at a receptacle (such as the remotely located receptacle of a remote meter reading system) is disclosed which includes a casing having an interior chamber, with the casing further including an outstanding plug portion for removable connection to the receptacle; display means located in the interior chamber; electrical supply means located in the interior chamber; and electrical circuit means located in the interior chamber and energized by said supply means for causing the display means to display a reading representative of the information. Novel ejection means are also disclosed for facilitating removal of the device from the receptacle into which it is plugged and various constructional features are disclosed for simply and compactly housing the various components of the device and making them available for repair and/or replacement.

13 Claims, 3 Drawing Figures

REMOTE SELF-CONTAINED PORTABLE READOUT DEVICE

FIELD OF THE INVENTION

This invention relates to remote visual readout devices of the type employed to remotely read a fluid meter, and more particularly relates to such devices which are self-contained, completely portable, and of improved construction.

BACKGROUND OF THE INVENTION

As well known in the art, a conventional fluid meter such as a water meter normally includes a register portion therof wherein a series of odometer wheels are driven (by mechanical or magnetic coupling) in response to the flow of fluid through the meter.

In recent years, much emphasis has been placed on the desirability of being able to read the meter from a remote location thereby eliminating the requirement for the meter reader to enter the premises wherein the meter is situated and also making meter reading possible for meters which are generally inaccessible.

Generally speaking, remote telemetering of fluid meters such as water meters is being accomplished by either pneumatic or electrical means. Typical of pneumatic remote telemetering systems is the system described and claimed in U.S. Pat. application Ser. No. 769,692 filed Oct. 22, 1968, now U.S. Pat. No. 3,626,696, in the name of Ronald A. Munier and Norman L. Meyerson and entitled "Pneumatic Remote Readout System for Meters" and assigned to the assignee of the instant invention.

In terms of electrical remote telemetering, prior art systems have evolved wherein electrical information representative of fluid located is brought by cabling from the meter register to a remotely located receptacle which provides the intended take-off point for meter reading and/or recordation. In systems of this type, the metermen (or women) are provided with a portable visual readout device which is plugged into the remotely located receptacle to provide a visual reading of the water flow through the meter.

Typical prior art visual readout devices, of the type over which the instant invention is intended to be an improvement, generally include two portions: the plug portion which is plugged into and received by the remotely located receptacle, and the readout portion including the display means, the electrical supply, etc. These two portions are interconnected by a suitable length of cabling. As can be appreciated, such systems are relatively bulky to work with, complex and expensive to manufacture (requiring double casings, protected cabling, joining same, etc.) and have many associated disadvantages which the instant invention effectively eliminates.

Another problem associated with prior art remote readout devices relates to the plug portion of the two part system. As suggested above, such plug portion normally carries a plurality of conductive pins which are received by appropriate apertures in the remote receptacle which provides the take off point for the meter reading system. With a plurality of tightly fitting pins, difficulty is experienced in removing the plug portion from the receptacle when the meter reading is complete. In the prior art, and to facilitate removal, ejector apparatus is provided which includes a bell crank lever arrangement one end of which is bifurcated so as to provide a pair of edge surfaces which swing into engagement with the receptacle (to eject the plug portion therefrom) when the opposite end of the bell crank lever arrangement is depressed by the operator. Although this principal of operation is generally satisfactory, the extremely limited area of surface engagement generated by the aforementioned bifurcated end of the bell crank lever arrangement, severely limits the amount of "push away" force generated by the ejection apparatus.

SUMMARY OF THE INVENTION

In contradistinction to the prior art, the instant invention provides a remote visual readout device which is a totally self-contained, portable, unitary device which completely eliminates the prior art systems involving a plug, readout portion and cabling therebetween. Thus the device of the instant invention includes a single casing having an interior chamber with the casing further including an outstanding plug portion for removable connection with the receptacle from which the information is being received and wherein the display means, the electrical supply means and the electrical circuit means for the device are all located within the interior chamber of the casing.

As an additional feature of the instant invention, an ejector arrangement is provided wherein a relatively large planar ejector plate is employed to "push-off" from the remote receptacle when the reading is complete. Such plate is a marked improvement over the aforementioned edge surfaces provided in prior art ejector arrangements. Additionally, and in accordance with the instant invention, finger depressing plates for operating the ejector arrangement are disposed on opposite sides of the handle of the device of the instant invention to facilitate operation by either left handed or right handed people.

Finally, a novel split case construction and interior arrangement for supporting the components of the device are provided, such constructional features minimizing production costs and greatly facilitating assembly and disassembly for repair and/or replacement of parts.

DETAILED DESCRIPTION

Figure 2:
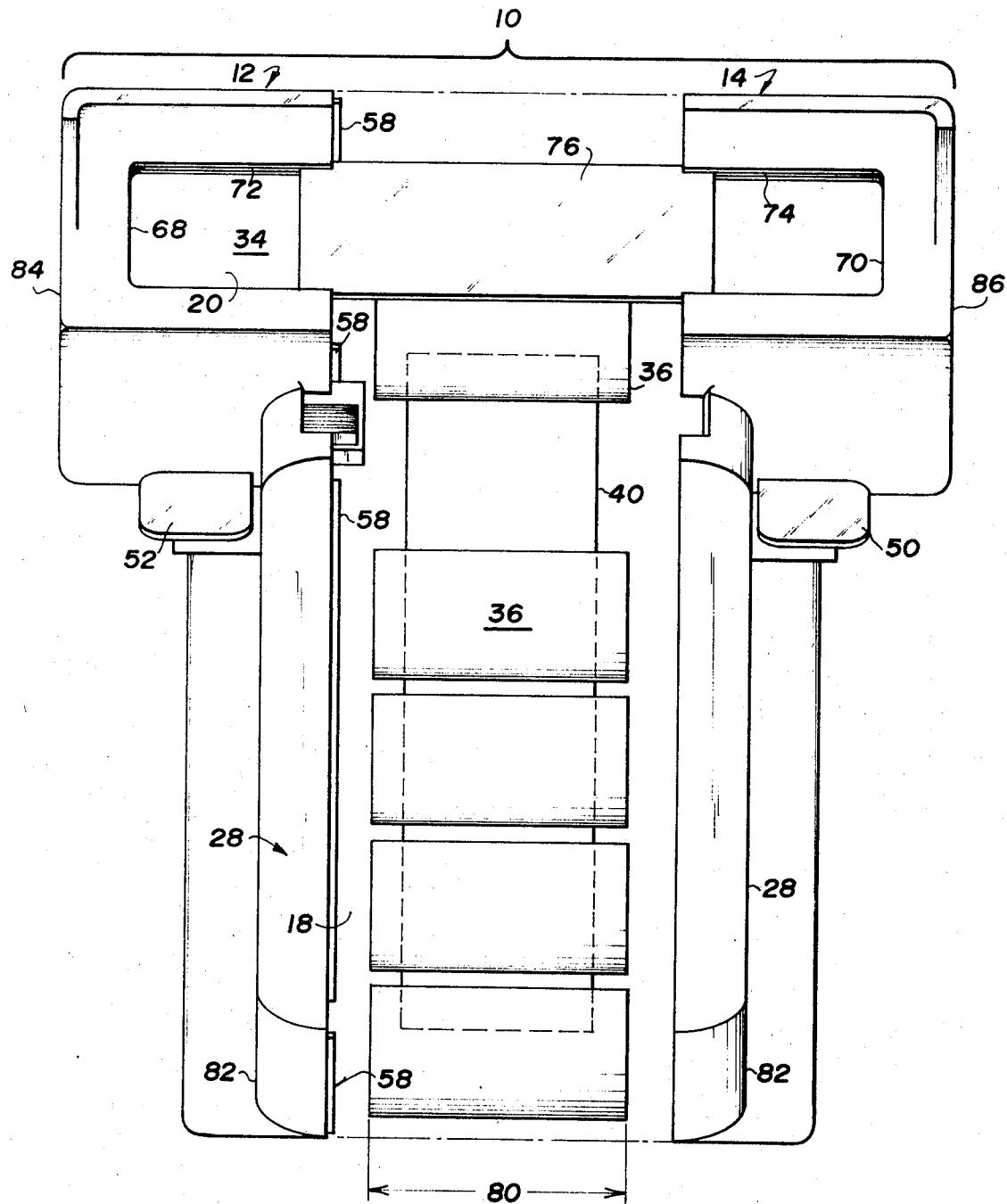
FIG. 2 is an exploded perspective front view of the self-contained, portable readout device of the instant invention.

Turning to the Figures wherein like numerals represent corresponding elements, there is shown in FIG. 2, in exploded perspective form, the remote visual readout device 10 of the instant invention. Broadly speaking, the device 10 comprises two hollow casing halves 12 and 14 of substantially identical, but of mirror image construction, removably secured to one another in a manner to be further described. When the casing halves 12 and 14 are secured to one another the casing thereby includes an interior chamber broadly designated 16 which may be said to include two compartments 18 and 20 in open communication with one another. Integrally projecting from the rear surface 22 of the readout device 10 are plug support plates 21, 23 which carry a plug portion 24 housing a plurality of apertured sockets 26 which telescopically receive corresponding pins disposed in a receptacle (not shown) remotely located from the meter intended to be read by the device 10. The device 10 further includes an integral handle portion 28.

The electrical components and characteristics of the device 10 can be understood by referring to U.S. Pat. application Ser. No. 160,398 filed July 7, 1971 in the name of Daniel Seltzer and assigned to the assignee of the instant invention, it being understood that the disclosure of said application is incorporated herein by specific reference thereto. For purposes of understanding this aspect of the instant invention, it is sufficient to note that located within the casing interior 16 is: the display means 30, for example a plurality of conventional display tubes 30 supportably mounted on a printed circuit board 32 such that the bulbs 30 are opposite a display window 34; electrical supply means such as a plurality of rechargeable batteries 36 (which may be recharged via conductive pins 37); and electrical circuit means broadly designated 38 mounted on a printed circuit board 40 for causing the display means 30 to display a reading representative of the information detected by the sockets 26 when the plug portion 24 is plugged into the corresponding receptacle associated with the water meter being remotely read.

From the brief description thus far presented, one of the major advantages of the instant invention should now become apparent. Specifically, the device 10 with all the various necessary components therein, is a completely self-contained portable visual readout display device which requires no further components to be operational and is to be distinguished from the complex plug and interconnected readout portion systems prevelent in the prior art.

Figure 1:
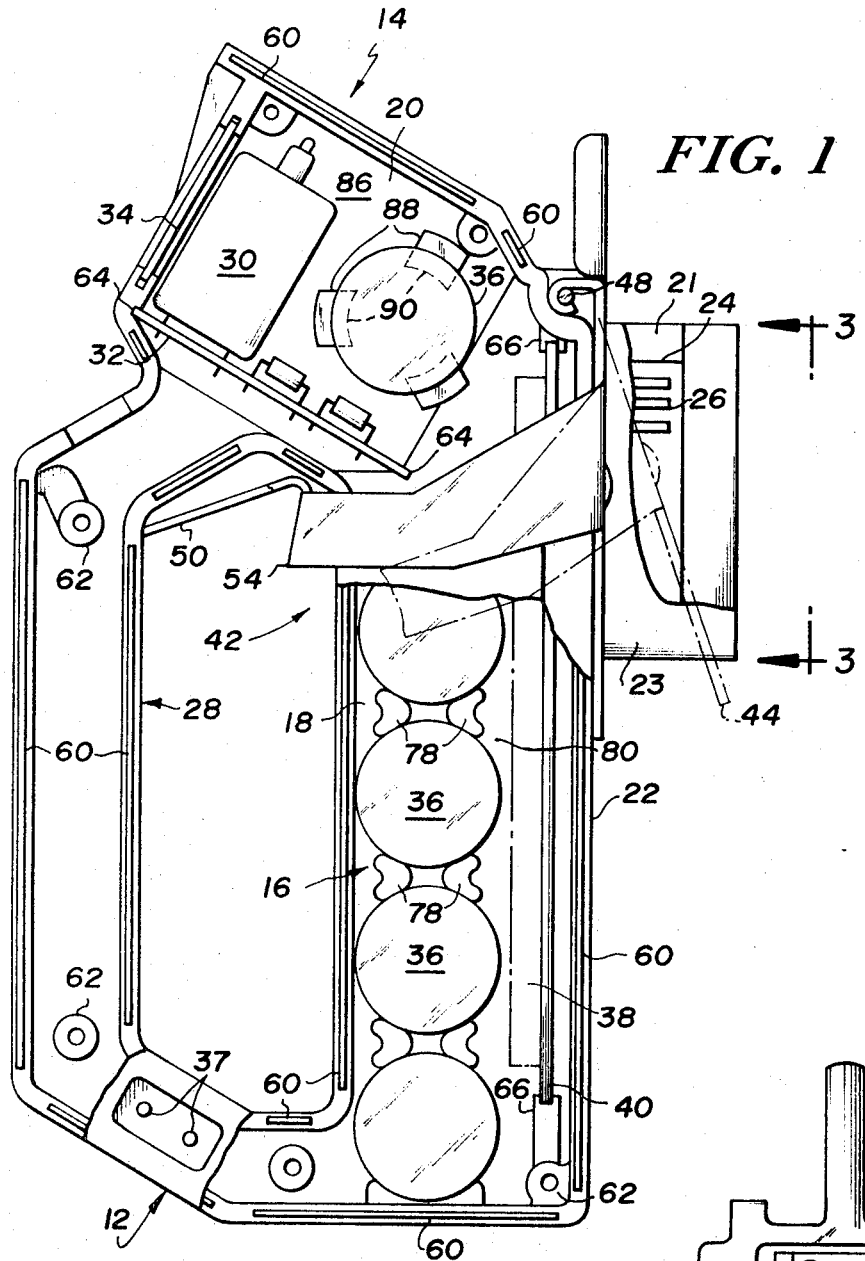
FIG. 1 is a side elevational view, partly in section, of one half of the self-contained, portable readout device of the instant invention.
Figure 3:
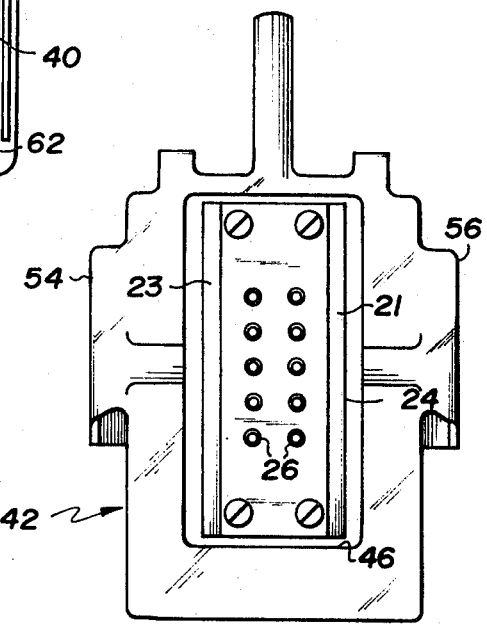
FIG. 3 is a view taken along the lines III—III of FIG. 1.

As noted previously, the device 10 of the instant invention is further provided with improved ejection means broadly designated 42 for facilitating removal of the plug portion 24 and the sockets 26 from the corresponding portions of the receptacle associated with the meter being read. The ejection means includes a generally flat ejection plate 44 provided with an elongated rectangular opening 46 therein such that the plate surrounds the plug portion 24. The plate 44 is pivotally secured to the casing at 48, and as suggested in phantom in FIG. 1, is movable between a first position in which the plate 44 lies flush on the rear surface 22 of the casing and a second position in which the ejection plate 44 is swung out away from the surface 22 such that the device 10 will be "pushed off" of the receptacle into which it was plugged during the reading operation. It will be appreciated that the opening 46 in the plate 44 is slightly longer than the plug portion 24 such that the plate may be non-interferringly swung between its first and second position illustrated in FIG. 1.

For pivoting the ejection plate between its first and second positions, the ejection means includes a pair of depressible finger plates 50 and 52 disposed on opposite sides of the handle portion 28 of the casing. Each of the finger plates 50 and 52 are connected by side plates 54 and 56 to the ejector plate 44 at a point below the pivoting fulcrum 48. Thus, whether left handed or right handed, all the operator has to do is to depress the corresponding thumb plate 50 or 52 and the ejector plate 44 will be swung toward its second position thereby materially assisting the operator in removing the plug portion and sockets from the corresponding portions of the receptacle into which it was plugged. It will be appreciated that regardless of the shape or configuration of the protective housing surrounding the receptacle into which the device of the instant invention is plugged, the large surface area made available by the planar ejector plate 44 of the instant invention will guarantee that at least some portion of the plate 44 will come into pushing engagement with some portion of the receptacle into which the device is plugged.

Returning to the specific construction of the casing, it will be seen that the casing half 12 is provided with outstanding tabs 58 along the outline thereof. Similarly, casing half 14 is provided with complementary recesses 60 following the outline thereof. It will be appreciated that such tabs are received by the corresponding recesses (in a tongue and groove fashion) when the halves are secured to one another for example by fastening means (such as screws not shown) passing through aligned openings 62 provided in the casing halves 12 and 14.

In similar fashion, printed circuit boards 32 and 40 are supported in slots 64 and channeled guideways 66 respectively which are provided on the complementary casing halves 12 and 14 and which captively hold such printed circuit boards when the halves 12 and 14 are secured to one another. In like manner, the casing halves include open ended slots 68, 70 which confront each other when the halves are secured to one another to establish the generally rectangular viewing opening 34. Moreover, the casing halves include channelways 72, 74 which slidably receive and captivate a transparent protective shield 76 when the halves are secured to one another.

In similar fasion, the interior walls of that portion of the casing halves which define the aforementioned first compartment 18 include positioning projections 78 for positioning the batteries 36 with respect to one another. It will be appreciated that the width of the casing at the vicinity of the compartment 18 corresponds to the length of the individual batteries indicated by the dimension 80 in FIG. 2. Thus when the casing halves 12 and 14 are secured to one another, the side walls 80 and 82 will captively prevent the batteries from experiencing side to side motion while the projections 78 will keep the batteries 36 properly spaced one above each other.

As seen in FIG. 2, one of the batteries 36 is housed in the compartment 20 which is significantly wider than the length of the batteries 36. However, and as seen in FIGS. 1, upstanding from the side walls 84 and 86 of the casing halves 12 and 14 are provided supporting and positioning seats 88 having lips 90 associated therewith which captivate the battery 36 when the halves 12 and 14 are secured to one another in the manner previously described.

From the above, the unique simplified construction of the instant invention and the ease of assembly and disassembly should now become apparent. Thus the various parts described are simply located in the respective slots and guideways or with respect to the aforedescribed projections, and the two casing halves 12 and 14 are secured to one another. With this one step operation, all of the various internal parts (i.e., the batteries, the printed circuit boards, the viewing member, etc.) are all captively sandwiched between the respective surfaces of the casing halves 12 and 14. It should be noted that the casing halves are of suitable plastic material and preferably injection molded.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

I claim:

1. A self-contained portable device for displaying a reading of information available at a receptacle; said device containing:
   a casing having an interior chamber, said casing further including an outstanding plug portion for removable connection to said receptable;
   display means located in said interior chamber;
   electrical supply means located in said interior chamber ; and
   electrical circuit means located in said interior chamber and energized by said supply means for causing said display means to display a reading representative of said information; wherein said casing includes externally accessible conductive pins leading to said interior chamber whereby said electrical supply means may be recharged from the exterior of said casing.

2. The device of claim 1 wherein a first group of said batteries are located above each other in said first compartment;
   said first compartment having a width corresponding to the length of each of said batteries;
   the interior walls of said casing which define said first compartment having inwardly extending positioning projections extending into said first compartment for positioning said betteries.

3. The device of claim 2 wherein said second compartment has a width greater than the width of said first compartment; at least one of said plurality of batteries being located in said second compartment;
   the interior walls of said casing which define said second compartment having inwardly extending positioning and supporting projections extending into said second compartment for positioning and supporting said one battery.

4. A self-contained portable device for displaying a reading of information available at a receptacle; said device containing:
   a casing having an interior chamber, said casing further including an outstanding plug portion for removable connection to said receptacle;
   display means located in said interior chamber;
   self-contained electrical supply means located in said interior chamber; and
   electrical circuit means located in said interior chamber and energized by said supply means for causing said display means to display a reading representative of said information; and wherein said casing further includes manually operable ejection means for facilitating removal of said plug portion from said receptacle; and wherein said ejection means comprises:
   a generally flat ejection plate surrounding said plug portion of said casing, said ejection plate being pivotally secured to said casing and movable between a first position in which said ejection plate lies flush on the surface of said casing from which said plug portion extends and a second position in which said ejection plate is swung out away from said surface; and
   manually operable means for pivoting said ejection plate between its first and second position.

5. The device of claim 4 wherein said casing includes a handle portion, and said manually operable means includes a pair of depressable finger plates disposed on opposite sides of said handle portion, each of said finger plates being secured to said ejection plate below the pivotal connection of said ejection plate to said casing; whereby depression of either of said finger plates will pivot said ejection plate between its first and second position.

6. The device of claim 5 wherein said interior chamber is divided into two compartments, a first compartment housing said electrical supply means, and a second compartment housing said display means;
   wherein said electrical supply means comprises a plurality of batteries;
   wherein a first group of batteries are located above each other in said first compartment; said first compartment having a width corresponding to the length of each of said batteries;
   the interior walls of said casing which define said first compartment having positioning projections extending into said first compartment for positioning said batteries; and
   wherein said second compartment has a width greater than the width of said first compartment; at least one of said plurality of batteries being located in said second compartment; the interior walls of said casing which define said second compartment having positioning and supporting projections extending into said second compartment for positioning and supporting said one battery.

7. A self-contained portable device for displaying a reading of information available at a receptacle, said device containing;
   a casing having an interior chamber, said casing further including an outstanding plug portion for removable connection to said receptacle;
   display means located in said interior chamber; self-contained electrical supply means located in said interior chamber; and
   electrical circuit means located in said interior chamber and energized by said supply means for causing said display means to display a reading representative of said information; and wherein said interior chamber is divided into two compartments, a first compartment housing said electrical supply means, and second compartment housing said display means.

8. A self-contained portable device for displaying a reading of information available at a receptacle; said device containing:
   a casing having an interior chamber, said casing further including an outstanding plug portion for removable connection to said receptacle;
   display means located in said interior chamber;
   electrical supply means located in said interior chamber; and
   electrical circuit means located in said interior chamber and energized by said supply means for causing said display means to display a reading representative of said information: and wherein said interior chamber is divided into two compartments, a first compartment housing said electrical supply means, and a second compartment housing said display means; and wherein said electrical supply means comprises a plurality of batteries.

9. A self-contained portable device for displaying a reading of information available at a receptacle; said device containing:
- a casing having an interior chamber, said casing further including an outstanding plug portion for removable connection to said receptacle;
- display means located in said interior chamber;
- electrical supply means located in said interior chamber; and
- electrical circuit means located in said interior chamber and energized by said supply means for causing said display means to display a reading representative of said information; and wherein said interior chamber is divided into two compartments, a first compartment housing said electrical supply means, and a second compartment housing said display means; and wherein said electrical supply means comprises a plurality of batteries; and wherein said batteries are rechargeable; and
- wherein said casing includes externally accessible conductive pins leading to said interior chamber whereby said batteries may be recharged from the exterior of said casing.

10. A self-contained device for displaying a reading of information available at a receptacle; said device containing:
- a casing having an interior chamber, said casing further including an outstanding plug portion for removable connection to said receptacle;
- display means located in said interior chamber;
- electrical supply means located in said interior chamber; and
- electrical circuit means located in said interior chamber energized by said supply means for causing said display means to display a reading representative of said information; wherein said casing is constructed of two casing halves removably secured to one another; and wherein said interior chamber is divided into two compartments, a first compartment housing said electrical supply means, said second compartment housing said display means.

11. A self-contained device for displaying a reading of information available at a receptacle; said device containing:
- a casing having an interior chamber, said casing further including an outstanding plug portion for removable connection to said receptacle;
- display means located in said interior chamber;
- electrical supply means located in said interior chamber; and
- electrical circuit means located in said interior chamber energized by said supply means for causing said display means to display a reading representative of said information; wherein said casing is constructed of two casing halves removably secured to one another; and wherein said interior chamber is divided into two compartments, a first compartment housing said electrical supply means, said second compartment housing said display means; and wherein one of said casing halves is provided with outstanding tabs along the outline thereof, and the other of said casing halves is provided with complementary recesses along the outline thereof;
- said recesses receiving said tabs when said halves are removably secured to one another; and wherein both of said halves include open ended slots which confront one another when said halves are secured to one another to establish a viewing opening through said casing; said halves having channelways surrounding said slots; and
- a transparent protective member slidably received by said channelways when said halves are secured to one another.

12. The device of claim 11 wherein said casing halves include preselectively located slots and channel guideways for captively supporting printed circuit boards associated with said display means and circuit means respectively when said casing halves are secured to one another.

13. A self-contained portable device for displaying a reading of information available at a receptacle; said device containing:
- a casing having an interior chamber, said casing further including an outstanding plug portion for removable connection to said receptacle;
- display means located in said interior chamber;
- electrical supply means located in said interior chamber; and
- electrical circuit means located in said interior chamber and energized by said supply means for causing said display means to display a reading representative of said information; and wherein said casing further includes manually operable ejection means for facilitating removal of said plug portion from said receptacle; and wherein said ejection means comprises:
- a generally flat ejection plate surrounding said plug portion of said casing, said ejection plate being pivotally secured to said casing and movable between a first position in which said ejection plate lies flush on the surface of said casing from which said plug portion extends and a second position in which said ejection plate is swung out away from said surface; and
- manually operable means for pivoting said ejection plate between its first and second position; and wherein said casing includes a handle portion, and said manually operable means includes a pair of depressable finger plates disposed on opposite sides of said handle portion, each of said finger plates being secured to said ejection plate below the pivotal connection of said ejection plate to said casing;
- whereby depression of either of said finger plates will pivot said ejection plate between its first and second position; and wherein said casing is constructed of two casing halves removably secured to one another;
- wherein one of said casing halves is provided with outstanding tabs along the outline thereof, and the other of said casing halves is provided with complementary recesses along the outline thereof; said recesses receiving said tabs when said halves are removably secured to one another; and
- wherein both of said halves include open ended slots which confront one another when said halves are secured to one another to establish a viewing opening through said casing; said halves having channelways surrounding said slots; and
- a transparent protective member slidably received by said channelways when said halves are secured to one another.

* * * * *